(12) United States Patent
Mahler et al.

(10) Patent No.: US 9,550,437 B2
(45) Date of Patent: Jan. 24, 2017

(54) SEAT FOR A DRIVER OF A CONSTRUCTION MACHINE, CONSTRUCTION MACHINE, AS WELL AS METHOD FOR ADJUSTMENT OF A SEAT

(71) Applicant: Hamm AG, Tirschenreuth (DE)

(72) Inventors: Gerhard Mahler, Windischeschenbach (DE); Axel Roemer, Tirschenreuth (DE)

(73) Assignee: Hamm AG (DE)

( * ) Notice: Subject to any disclaimer, the term of this patent is extended or adjusted under 35 U.S.C. 154(b) by 0 days.

(21) Appl. No.: 14/714,503

(22) Filed: May 18, 2015

(65) Prior Publication Data

US 2015/0360586 A1 Dec. 17, 2015

(30) Foreign Application Priority Data

May 19, 2014 (DE) .......................... 10 2014 209 465

(51) Int. Cl.
*B60N 2/02* (2006.01)
*B60N 2/06* (2006.01)
(Continued)

(52) U.S. Cl.
CPC ............. *B60N 2/0232* (2013.01); *B60N 2/062* (2013.01); *B60N 2/067* (2013.01); *B60N 2/24* (2013.01); *B60N 2/38* (2013.01); *B60N 2002/024* (2013.01); *B60N 2002/0236* (2013.01); *B60N 2002/0272* (2013.01); *E01C 2301/30* (2013.01)

(58) Field of Classification Search
CPC ....... B60N 2/0224; B60N 2/0232; B60N 2/04; B60N 2/062; B60N 2/067; B60N 2/24; B60N 2/38; B60N 2002/0236; B60N 2002/0272; B60N 2002/024; E01C 2301/30

See application file for complete search history.

(56) References Cited

U.S. PATENT DOCUMENTS 5,427,345 A * 6/1995 Yamakami ........... B60N 2/0296
248/394
6,352,006 B1 * 3/2002 Kurashita ............ B60N 2/0232
297/330

(Continued)

FOREIGN PATENT DOCUMENTS

DE 19813474 A1 10/1999
DE 10109185 A1 8/2002
(Continued)

OTHER PUBLICATIONS

European Search Report in corresponding European Patent Application EP 15166975, dated Sep. 21, 2015, 4 pp (not prior art).

*Primary Examiner* — Philip Gabler
(74) *Attorney, Agent, or Firm* — Lucian Wayne Beavers; Patterson Intellectual Property Law PC

(57) ABSTRACT

In a seat (1) for a driver of a construction machine, in particular for a road roller, featuring a movable seating carriage (8) with seat adjustment in no less than one shifting direction via a drive motor (12) which is coupled to the seating carriage (8) via a transmission element (14), and featuring a control device (16) for the seat adjustment, it is provided for the following features to be achieved: for mechanical adjustment of the seating carriage (8), the drive motor (12) and/or the seating carriage (8) is decouplable from the transmission element (14).

18 Claims, 2 Drawing Sheets

(51) Int. Cl.
   *B60N 2/24*     (2006.01)
   *B60N 2/38*     (2006.01)

(56) References Cited

U.S. PATENT DOCUMENTS

| | | | | |
|---|---|---|---|---|
| 6,626,064 | B1* | 9/2003 | Maue | B60N 2/0228 |
| | | | | 297/344.13 |
| 7,845,703 | B2* | 12/2010 | Panzarella | B60N 2/0232 |
| | | | | 296/65.11 |
| 8,024,991 | B2* | 9/2011 | Weber | B60N 2/0232 |
| | | | | 297/378.12 |
| 8,435,150 | B2* | 5/2013 | Schuler | B60N 2/0232 |
| | | | | 475/166 |
| 2003/0075963 | A1 | 4/2003 | Oberbeck | |
| 2006/0225935 | A1 | 10/2006 | Avikainen et al. | |
| 2007/0164592 | A1* | 7/2007 | Gerhardt | B60N 2/14 |
| | | | | 297/344.23 |
| 2012/0319445 | A1* | 12/2012 | Zolno | B60N 2/0232 |
| | | | | 297/338 |
| 2013/0193732 | A1* | 8/2013 | Brand | B60N 2/14 |
| | | | | 297/344.21 |

FOREIGN PATENT DOCUMENTS

| | | |
|---|---|---|
| DE | 10152556 C1 | 10/2002 |
| DE | 202004004946 U1 | 8/2005 |
| GB | 1031434 | 6/1966 |
| GB | 2498199 A | 7/2013 |
| WO | 03013903 A1 | 2/2003 |

* cited by examiner

SEAT FOR A DRIVER OF A CONSTRUCTION MACHINE, CONSTRUCTION MACHINE, AS WELL AS METHOD FOR ADJUSTMENT OF A SEAT

BACKGROUND OF THE INVENTION

1. Field of the Invention

The invention relates to a seat for a driver of a construction machine, in particular for a road roller, to a construction machine, as well as to a method for adjusting a seat.

2. Description of the Prior Art

A construction machine, namely, a road roller featuring a seat for a driver which is movable transversely to the construction machine's direction of travel is known from DE 198 13 474 A1. A seating carriage is intended to this effect which is movable on guides extending transversely to the construction machine's direction of travel. In a comfort option, such shiftable seats feature an electrically movable seating carriage, the drive motor of which can be driven by means of a control device for the seat adjustment.

When purchasing the machine, a decision must be made as to whether a mechanical or an electrical adjustment of the seat is to be implemented.

If the construction machine is equipped with an electrical seat adjustment, there is the disadvantage that if, for example, the driver's seat is to change from the outermost left position to the outermost right position as seen in the direction of travel, the electrical drive requires a lot of time to perform the maximum path of travel.

SUMMARY OF THE INVENTION

It is therefore the object of the invention, in a seat for a driver of a construction machine with a motor-driven adjustment device, or in a method for adjusting a seat movable by means of a motor, respectively, to enable a rapid adjustment in case of long paths of travel.

The invention advantageously intends, for mechanical adjustment of the seating carriage, for the drive motor and/or the seating carriage to be decouplable from the transmission element driving the seating carriage. The electrical drive and/or the seating carriage is therefore decoupled from the driving transmission element for manual adjustment of the seating carriage. This results in the electrical seat adjustment being adjustable manually by the driver in the decoupled state without being required to generally forego the convenient electrical adjustment option. The driver can, at any time, choose between mechanical adjustment and electrical adjustment.

It is preferably intended for a position detection device to detect the current position of the seating carriage and to transmit a measuring signal of the current position at any time to the control device. Said position detection of the seating carriage is to be performed independent of the electrical drive motor.

The transmission element is preferably comprised of a drive chain which is movable with the seating carriage. In this design, the drive chain extends parallel to the moving direction of the seat.

In a preferred embodiment, it is intended for the drive motor, for the purpose of decoupling from the transmission element, to be shiftable against the force of a return spring.

It is preferably intended for the drive motor, for the purpose of decoupling from the transmission element, to be shiftable via a mechanical or electrical decoupling device. The drive motor can be decoupled, for example, against the force of the return spring via a lever or electrically by means of an electrical solenoid operatable via a switch.

The drive chain may be couplable to the drive motor via a first sprocket, in which design the first sprocket may be provided with an internal toothing, for example, a splined toothing, and the drive motor may be provided with a drive shaft which features an external toothing adapted to the internal toothing. In case of the drive motor being coupled to the sprocket, the drive shaft, with its external toothing, engages with the internal toothing of the first sprocket.

In a preferred embodiment, it is intended for the position detection device to detect the position of the seating carriage or of the transmission element by means of a sensor device.

In this design, the position detection device can detect the position of the transmission element via a rotary sensor which is coupled to a second sprocket being engaged with the drive chain. Such rotary sensor is, for example, a rotary potentiometer arranged coaxially to the sprocket.

As a result, the shiftable seating carriage is movable by the motor-driven transmission element or, alternatively, manually.

The invention also relates to a construction machine, in particular a road roller, featuring the previously described seat, and to a method for adjusting the seat movable by means of a motor.

In the following, embodiments of the invention are explained in greater detail.

BRIEF DESCRIPTION OF THE DRAWINGS

The following is shown.

DETAILED DESCRIPTION

Figure 1:
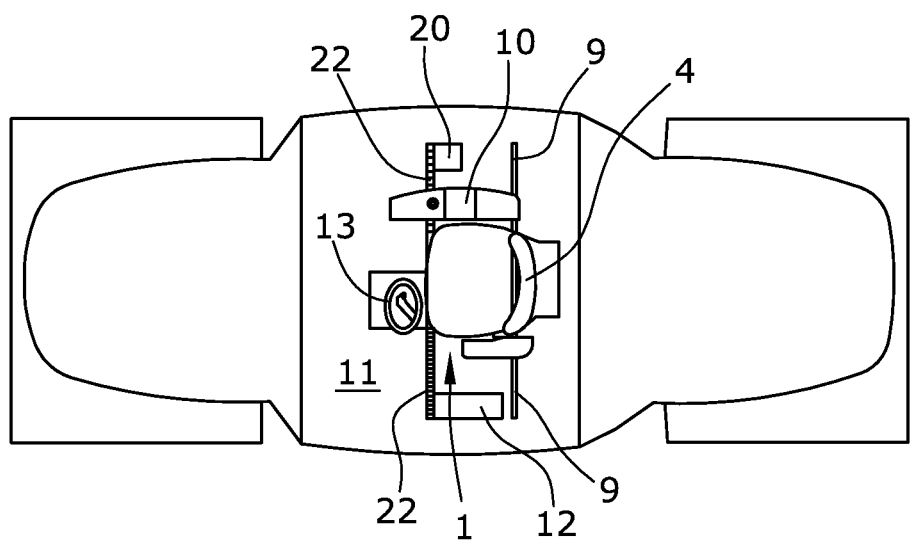
FIG. 1 a top view of a road roller featuring a seat movable in particular in transverse direction, FIG. 2 a perspective view of the seat, FIG. 3 the drive for the seating carriage, and FIG. 4 an enlarged illustration of the drive unit.

FIG. 1 shows a schematic top view of a road roller featuring a seat 1 shiftable, as a minimum, transverse to the direction of travel on a platform 11 of an operator's stand. The seat 1 comprises a seat surface 2 facing in the direction of travel 3, said seat surface 2 being limited towards the rear by a seat backrest 4. The seat surface 2 is mounted on a seat console 6 which is attached on a movable seating carriage 8 which is movable, along no less than one guiding device 9, transverse to the direction of travel 3 by means of an electrical drive and a control device 16.

Figure 2:
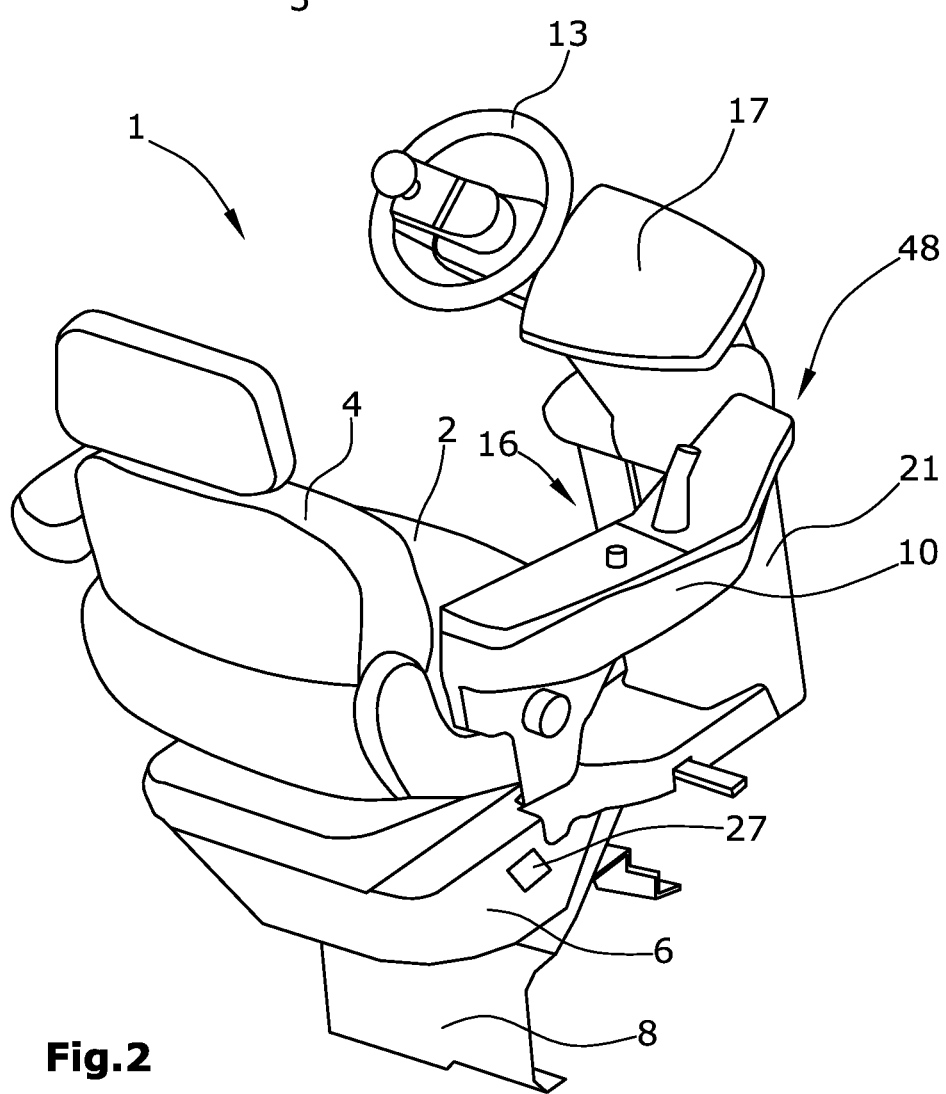

As can be inferred from FIG. 2, a steering column 21 movable together with the seat 1 and featuring a steering device 13, as well as a dashboard 17 are attached to the seat 1.

An armrest 10 is preferably provided on the right-hand side of the seat 1 which features operating and indication elements 48 and may also accommodate, for example, a control device 16 for the seat adjustment.

The electrical drive unit for the seat adjustment is, in total, fastened on the platform 11 of the operator's stand of the road roller at one end of the path of travel of the seat 1.

The electrical drive unit comprises a drive motor 12 drivable in both directions of rotation which is coupled to the seating carriage 8 via a transmission element 14, for example, in the form of a drive chain 22.

The drive chain 22 may be intended as a continuously revolving chain which is returned via a first drive sprocket 28 on the motor side and a second sprocket 40 arranged at the other end of the path of travel.

The second sprocket 40 is preferably coupled to a position detection device 20.

In FIG. 1, the position detection device 20 is depicted on the right-hand side and the drive motor 12 on the left-hand side of the road roller as seen in the direction of travel 3. As indicated in Fig. 3, the position detection device 20 may also be referred to as a sensor or sensor device 38.

Figure 3:
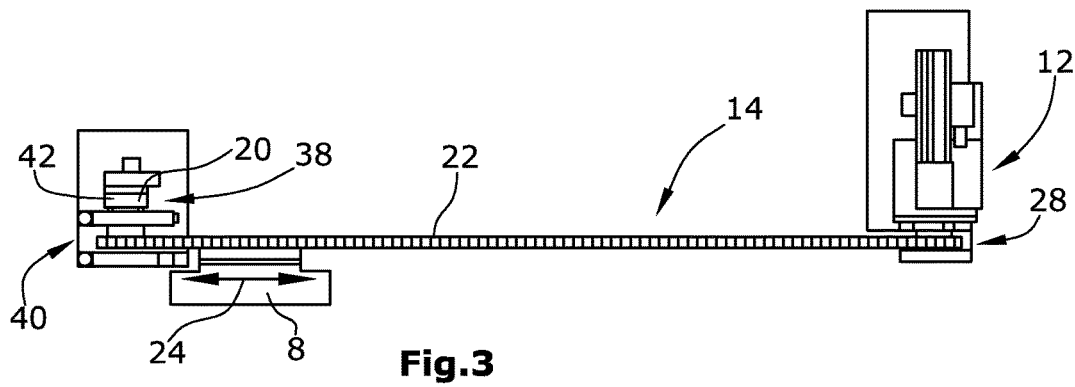

In FIG. 3, only the coupling member to the seating carriage 8 is depicted to represent the seating carriage 8. The direction of movement 24 of the seating carriage 8 shiftable to and fro transverse to the direction of travel 3 is indicated on the coupling member of the seating carriage 8.

The sprocket 40 coupled to the drive chain 22 is coupled to a rotary sensor 42, for example, a rotary potentiometer, which transmits a current position signal for the seating carriage 8 to the control device 16. This is of significance, for example, in order to determine the end points of the path of travel of the seating carriage 8, in particular if the drive motor 12 or the seating carriage 8 has, in the meantime, been decoupled from the drive chain 22.

Figure 4:
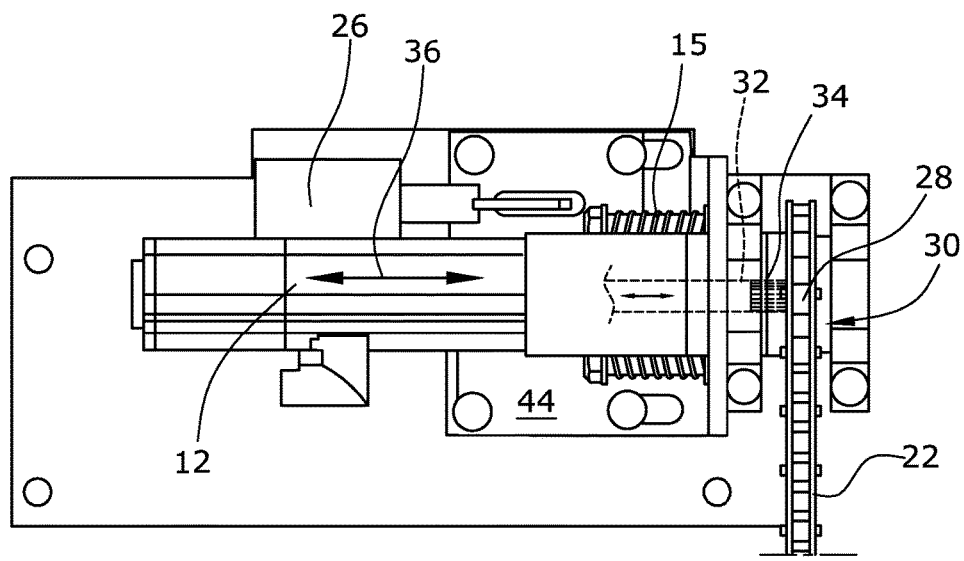

FIG. 4 is an enlarged illustration of the drive unit shown on the right-hand side of FIG. 3. The drive motor 12 is arranged to shift in transverse direction to the drive chain 22 and to the direction of movement 24 of the seating carriage 8 so that the drive shaft 32 of the drive motor 12 is optionally either engaged with the first drive sprocket 28 during motor-driven operation, or is not engaged with the drive sprocket 28 during manual operation. The drive sprocket 28 features an internal toothing 30, for example, a splined toothing that is adapted to an external toothing 34, adapted to said toothing, at the free end of the drive shaft 32.

The drive motor 12, with the drive shaft 32, can be disengaged from the first drive sprocket 28 against the force of, for example, a compression spring 15. This can be effected mechanically via a lever or, as depicted in FIG. 4, by means of an electrical decoupling device 26 comprised of a solenoid.

To this effect, the drive motor 12 is mounted on a shiftable plate 44.

The operation of the electrical decoupling device 26 may be effected by means of a switch 27 which is arranged, for example, at the seat console 6 or on the armrest 10.

When operating the switch 27 designed as, for example, a pushbutton, the electrical solenoid of the decoupling device 26 decouples the drive motor 12 from the drive sprocket 28 so that the seating carriage 8 with the seat 1 is shiftable freely laterally by means of the strength of the driver. When the driver has reached the desired end position of the seat 1, the decoupled state is undone again by means of the switch 27 so that the seat 1 is now again retained in the chosen position and can be operated electrically. The coupling and decoupling movement of the drive motor 12 is in the direction of arrows 36 as seen in Fig. 4.

The invention claimed is:

1. A road roller with a seat for a driver, comprising:
   a movable seat carriage;
   a steering column movable together with the seat carriage;
   a drive motor;
   a transmission element extending between the seat carriage and the drive motor so that the seat carriage is movable in at least one shifting direction by power from the drive motor;
   a controller to control the drive motor; and
   wherein at least one of the seat carriage and the drive motor is configured to be selectively decoupled from the transmission element to allow rapid manual movement of the seat carriage in case of long paths of travel between an outermost left position and an outermost right position as seen in a direction of travel.

2. The road roller of claim 1, further comprising:
   a position sensor configured to detect a current position of the seat carriage and to transmit a measuring signal of the current position to the controller.

3. The road roller of claim 1, wherein the transmission element includes a drive chain movable with the seat carriage.

4. The road roller of claim 1, further comprising:
   a return spring biasing the drive motor to engage the transmission element.

5. The road roller of claim 1, further comprising:
   an actuator configured to shift the drive motor to decouple the drive motor from the transmission element.

6. The road roller of claim 1, wherein:
   the transmission element includes a drive chain and a sprocket, the sprocket having an internal toothing; and
   the drive motor includes a drive shaft having an external toothing configured to be received in the internal toothing of the sprocket to couple the drive motor to the transmission element.

7. The road roller of claim 1, further comprising:
   a position sensor configured to detect a current position of the transmission element and to transmit a measuring signal of the current position to the controller.

8. The road roller of claim 1, wherein:
   the transmission element includes a drive chain and a sprocket; and
   further comprising a rotary position sensor operably associated with the sprocket to detect a position of the transmission element and to transmit a measuring signal of the current position to the controller.

9. A seat apparatus for a driver of a construction machine, comprising:
   a seat carriage;
   a drive motor;
   a transmission element extending between the seat carriage and the drive motor so that the seat carriage is movable in at least one shifting direction by power from the drive motor;
   a controller to control the drive motor; and
   wherein the drive motor is configured to be selectively decoupled from the transmission element to allow manual movement of the seat carriage.

10. The apparatus of claim 9, wherein:
    the transmission element includes a drive chain and a sprocket, the sprocket having an internal toothing; and
    the drive motor includes a drive shaft having an external toothing configured to be received in the internal toothing of the sprocket to couple the drive motor to the transmission element.

11. The apparatus of claim 10, further comprising:
    a return spring biasing the drive motor to engage the external toothing of the drive shaft with the internal toothing of the sprocket.

12. The apparatus of claim 10, further comprising:
    an actuator configured to shift the drive motor to disengage the external toothing of the drive shaft from the internal toothing of the sprocket.

13. The apparatus of claim 9, wherein:
    the transmission element includes a drive chain and a sprocket; and
    further comprising a rotary position sensor operably associated with the sprocket to detect a position of the transmission element and to transmit a measuring signal of the current position to the controller.

14. The apparatus of claim 9, further comprising:
a position sensor configured to detect a current position of the seat carriage and to transmit a measuring signal of the current position to the controller.

15. The apparatus of claim 9, further comprising:
a position sensor configured to detect a current position of the transmission element and to transmit a measuring signal of the current position to the controller.

16. The apparatus of claim 9, wherein the transmission element includes a drive chain movable with the seat carriage.

17. The apparatus of claim 9, further comprising:
a return spring biasing the drive motor to engage the transmission element.

18. The apparatus of claim 9, further comprising:
an actuator configured to shift the drive motor to decouple the drive motor from the transmission element.

* * * * *